(12) United States Patent
Choi et al.

(10) Patent No.: US 8,640,195 B2
(45) Date of Patent: Jan. 28, 2014

(54) METHOD AND SYSTEM FOR AUTOMATING SECURITY POLICY DEFINITION BASED ON RECORDED TRANSACTIONS

(75) Inventors: Christopher Young-Soo Choi, Southport (AU); Christopher John Hockings, Burleigh Waters (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/570,293

(22) Filed: Sep. 30, 2009

(65) Prior Publication Data

US 2011/0078759 A1    Mar. 31, 2011

(51) Int. Cl.
 *G06F 7/04* (2006.01)
(52) U.S. Cl.
 USPC .................................................. 726/2
(58) Field of Classification Search
 None
 See application file for complete search history.

(56) References Cited

U.S. PATENT DOCUMENTS

| | | | |
|---|---|---|---|
| 6,950,802 B1 * | 9/2005 | Barnes et al. ................. 705/7.22 |
| 7,308,702 B1 | 12/2007 | Thomsen et al. | |
| 7,340,469 B1 * | 3/2008 | Alghathbar et al. ................... 1/1 |
| 7,506,371 B1 | 3/2009 | Ben-Natan | |
| 7,516,476 B1 * | 4/2009 | Kraemer et al. ................... 726/1 |
| 2002/0184525 A1 * | 12/2002 | Cheng ........................... 713/201 |
| 2003/0110192 A1 * | 6/2003 | Valente et al. ................. 707/513 |
| 2004/0162781 A1 * | 8/2004 | Searl et al. ....................... 705/51 |
| 2005/0119905 A1 * | 6/2005 | Wong et al. ........................ 705/1 |
| 2005/0193196 A1 * | 9/2005 | Huang et al. ................... 713/166 |
| 2006/0026669 A1 * | 2/2006 | Zakas .................................. 726/6 |
| 2006/0147043 A1 * | 7/2006 | Mann et al. ..................... 380/270 |
| 2006/0184995 A1 * | 8/2006 | Backes et al. ...................... 726/1 |
| 2006/0277184 A1 | 12/2006 | Faitelson et al. | |
| 2007/0282778 A1 * | 12/2007 | Chan et al. ....................... 706/48 |
| 2008/0104393 A1 | 5/2008 | Glasser et al. | |
| 2008/0235168 A1 | 9/2008 | Chan et al. | |
| 2008/0244736 A1 * | 10/2008 | Lampson et al. ................ 726/21 |
| 2009/0077621 A1 | 3/2009 | Lang et al. | |
| 2009/0138939 A1 * | 5/2009 | Kumar et al. ...................... 726/1 |

OTHER PUBLICATIONS

Bindview Unveils Policy Center—A Comprehensive Web-based Security Policy Devleopment and Management, Business Wire, Jul. 29, 2002.*
Bindview Operations Center—marketing document, BindView, 2003.*
Sam Costello, BindView, Procinct release security services, Aug. 2, 2002, Computerworld.*
Elemental Security Platform—Agent Based Host Security Policy Compliance and Management, May 17, 2005.

* cited by examiner

*Primary Examiner* — Cordelia Zecher
(74) *Attorney, Agent, or Firm* — Jeffrey S. LaBaw; David H. Judson

(57) ABSTRACT

Following development of an application, the application is deployed in a pre-production environment. A user role plays against that application, typically by performing one or more operations as a particular user in a particular group. As the operator role plays, access logs are written, and these logs are then analyzed and consolidated into a set of commands that drive a policy generator. The policy generator creates an optimized security policy that it then deploys to one or more enforcement points. In this manner, the framework enables automated configuration and deployment of one or more security policies.

21 Claims, 3 Drawing Sheets

METHOD AND SYSTEM FOR AUTOMATING SECURITY POLICY DEFINITION BASED ON RECORDED TRANSACTIONS

BACKGROUND OF THE INVENTION

1. Technical Field

This disclosure relates generally to computer-implemented techniques for designing, configuring and managing security policies within an organization.

2. Background of the Related Art

Managing security policies within an organization is often a difficult task. Many organizations have some understanding of their employees' roles within their organization and the information technology (IT) functions a user in a given role needs to access to conduct his or her daily job. Translating these access requirements to security policies within a given security framework, however, can be tedious and complicated.

More specifically, the existing processes and techniques for designing and configuring security policies often suffer from the following problems. First, the security administrator must have in-depth knowledge of the technology for which policy will be configured. For example, if one is to implement a security policy within a known system, one needs to understand how to use access control lists, object policies and authorization rules, as well as understanding the full application scope at issue. Acquiring such knowledge can be very time-consuming and costly. Second, translating a business security requirement for access control to a technology-specific design is often an inexact activity, especially in cases where the available security framework cannot represent that requirement precisely.

While there are known solutions (such as IBM® Tivoli® Security Policy Manager) that attempt to address these problems by separating a business security view from IT systems implementation, they still require the security administrator to understand various policy configuration items even if vendor-neutral or standards-based.

There remains a need to provide a security framework that can translate role-based access requirements directly to security policies.

BRIEF SUMMARY OF THE INVENTION

The subject matter herein provides a security framework method and system that removes the complexity associated with security policy authoring and enables such policies to be automatically defined and deployed. In an illustrative embodiment, an interface is provided through which an operator (such as a business security analyst) can role play and, as a result, a series of transactions that users of a particular role are entitled to perform are recorded. Thus, for example, transactions are recorded as the role player accesses various IT functions while role playing a specific role. Based on these recorded user transactions, the system then automatically generates one or more security policies. These policies can be extended to similar transactions, and generated policies may be optimized, or they may be consolidated to reduce redundancy. The policies are then distributed to various policy decision and enforcement points within the organization.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
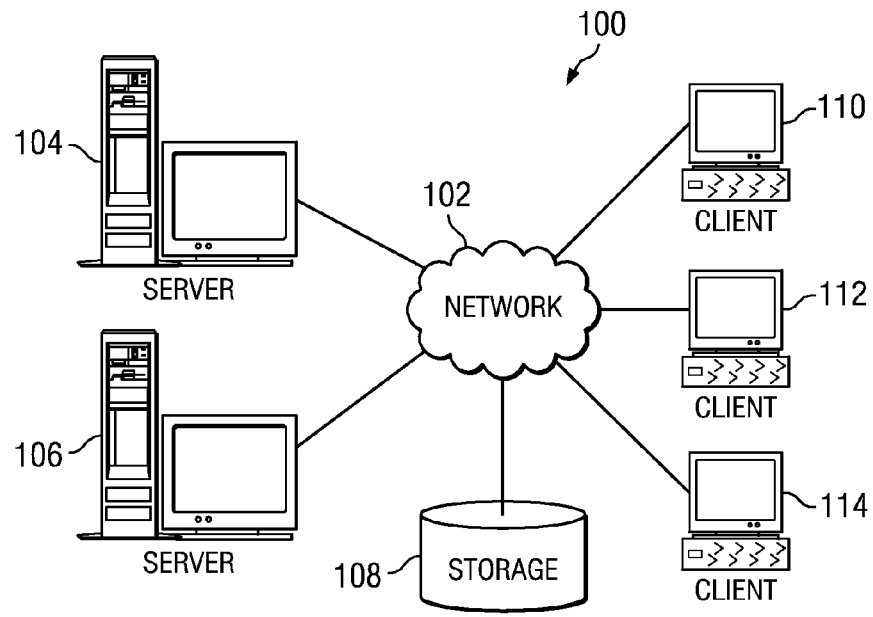
FIG. 1 is an exemplary block diagram of a distributed data processing environment in which exemplary aspects of the illustrative embodiments may be implemented.
Figure 2:
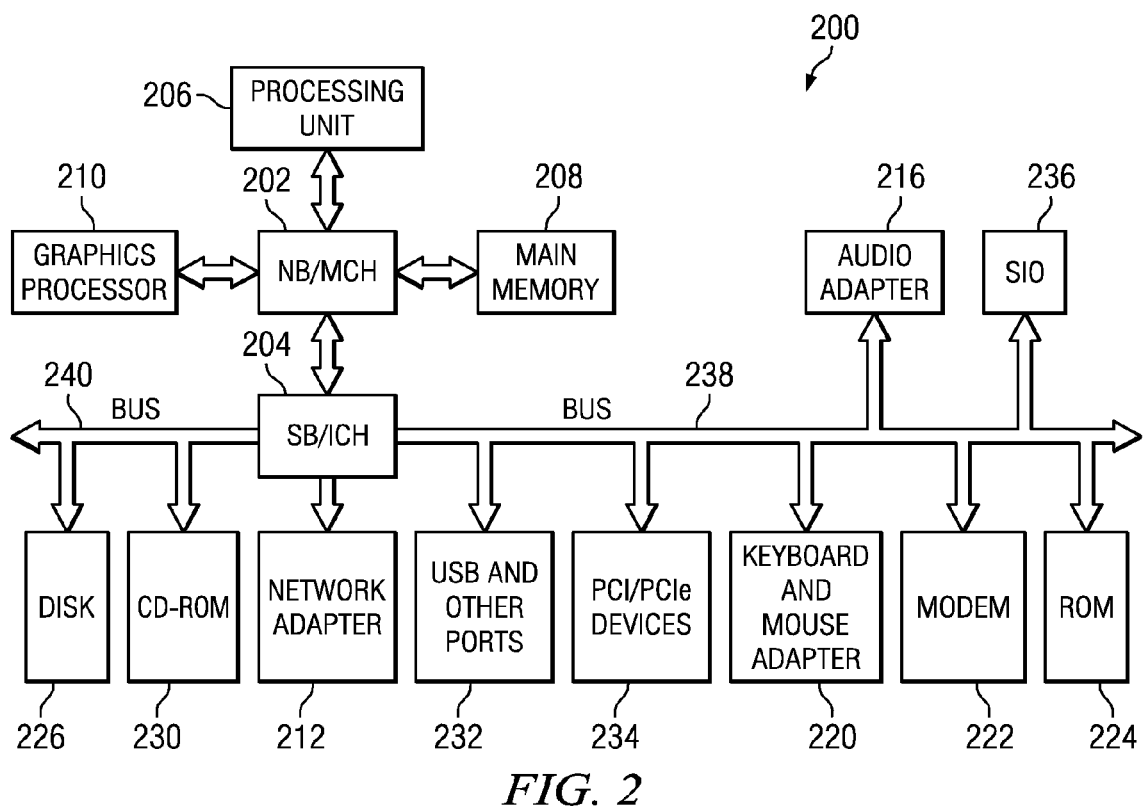
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

In the depicted example, data processing system 200 employs a hub architecture including bridge and memory controller hub (NB/MCH) 202 and bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java and all Java-based trademarks and logos are trademarks of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system. IBM, AIX, eServer, MQSeries, and system P are trademarks or registered trademarks of International Business Machines Corporation in the United States, other countries, or both. LINUX is a registered trademark of Linus Torvalds in the United States, other countries, or both. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the disclosure may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Figure 3:
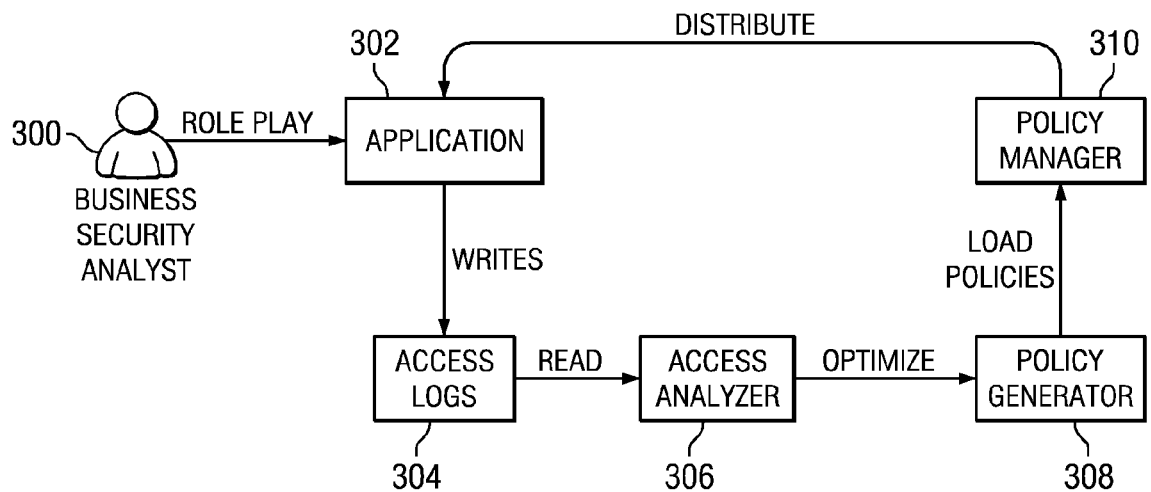
FIG. 3 illustrates a method and system for automated security policy authoring and deployment according to this disclosure.

FIG. 3 illustrates a representative implementation of the security framework of this disclosure. An individual, designated by reference numeral 300, provides inputs to the system as will be described. Typically, the individual is a business security analyst (BSA), namely, an individual who understands the security roles (or personas) for the organization and how individuals assigned to those roles use functions within a particular Information Technology (IT) system within or across the enterprise. The use of a BSA is not a limitation, as that role may be carried out by others. As used herein, the term "organization" or "enterprise" should be broadly construed and is not limited to a particular physical location or even legal entity. An enterprise's computer resources may extend across a wide geographic area and may involve one or more partners and their computing resources. Traditionally, such access requirements had to be manually translated by application developers and security administrators to technology-specific security policies. According to this disclosure, and in contrast to the known prior art, the BSA directly interacts with an application 302 (or more generally, the security framework of this invention) to automatically define and deploy the security policies.

In particular, and with reference to FIG. 3, the BSA 300 selects a security role to role play and accesses a set of functions of the application 302 required for that role. It is assumed that the BSA has some a priori knowledge of what resources he or she may access through the application 302 so that he or she can exercise the correct allowed authorization decisions. The particular application 302 may vary and there is no limitation on the type of application that may be "exercised" during the role playing. For example, the application 302 may be a Help Desk application that simulates various Help Desk functions. In FIG. 3, the application is shown as a single entity, but this is not a limitation, as there may be multiple applications involved (in other words, an application suite). The application 302 here is deployed in a pre-production environment. In one example role, the BSA 300 role plays as a Help Desk employee and runs through a series of "use" cases to thereby "exercise" the application within the context of a given role. These use cases are designed to simulate the manner in which access to the Help Desk (in this example) may be expected to occur when the application is later deployed in the actual production environment. Thus, in a typical case, access to the application is through multiple network components (such as firewalls, proxies, web servers, and the like), and each such component may enforce its own set of security policies and is unaware of the context in which a particular access is required. By role playing through these various use cases, the inventive technique is used to facilitate the security policy design and deployment that avoids being unnecessarily permissive or restrictive, as will be seen.

Irrespective of what application 302 is used, an identifier for the selected role is recorded in an application session. As the BSA 300 role plays, the application 302 records the details of the functions accessed in access logs 304. Preferably, this step is carried out using the application's native logging capabilities, in which case no additional or supplemental logging mechanism to be implemented, but this is not a requirement. Preferably, and at a minimum, a log entry comprises the values of security attributes used in the security policies, e.g., one or more of: URL, access time, transaction data, and the like. An access analyzer 306 reads the access logs 304 and optimizes the access patterns in a manner described in more detailed below. For example, identical accesses on multiple resources might be conveniently condensed into a single policy definition. The access analyzer 306 preferably also makes use of a resource hierarchy (e.g., a directory tree) to consolidate accesses. A policy generator 308 translates the access patterns to technology-specific policies and then loads these policies into a policy manager 310. The policy manager 310 is responsible for distributing the policies to one or more security policy enforcement points within or across the enterprise.

The security framework shown in FIG. 3 comprises data processing systems and devices such as described above with respect to FIGS. 1-2. Of course, one or more of the access analyzer 306, policy generator 308 and policy manager 310 typically comprise software applications and utilities, and the representation shown in FIG. 3 has been simplified for discussion and illustration purposes. Portions of the security framework may utilize known products. Thus, for example, a representative policy manager 310 for distributing the policies to different enforcement points is IBM Tivoli Security Policy Manager. The BSA 300/application 302 interaction preferably is facilitated through an interface such as may be provided by native security framework functionality, or by using products such as IBM Tivoli Access Manager for e-business (TAMeb), which has an auditing capability that logs access information to all web applications that it protects. Thus, in one embodiment, the techniques described herein may be implemented using IBM Tivoli Access Manager as a front-end and IBM Tivoli Security Policy Manager as a back-end, although, of course, this is not a limitation of the invention. In such an embodiment, the Tivoli Access Manager generates the audit records as the role playing is carried out, and the Tivoli Security Policy Manager creates one or more policies that are pushed out to other enterprise systems (including, without limitation, the Tivoli Access Manager itself).

The basic technique described above can be modified to extend its usability and usefulness. For example, an additional editing interface may be provided to enable the security administrator (e.g., the BSA) to review and modify the generated policies before they are loaded into the policy manager. The interface may be a web-based GUI with known tools and controls, command-line based, or otherwise. This allows a two-stage approach to the security implementation, wherein preferably the majority of the security policies are automatically generated by the described technique and any required fine tuning is done by this additional editing interface. The security administrator may configure attributes of a request or the application context that can be used to group together similar transactions. Such a parameterized interface may be a desirable extension where data is input to the application as a Web service or for applications under test where authorization based on resource name or location is not fine-grained enough (and/or a web service method or operation is also required).

Figure 4:
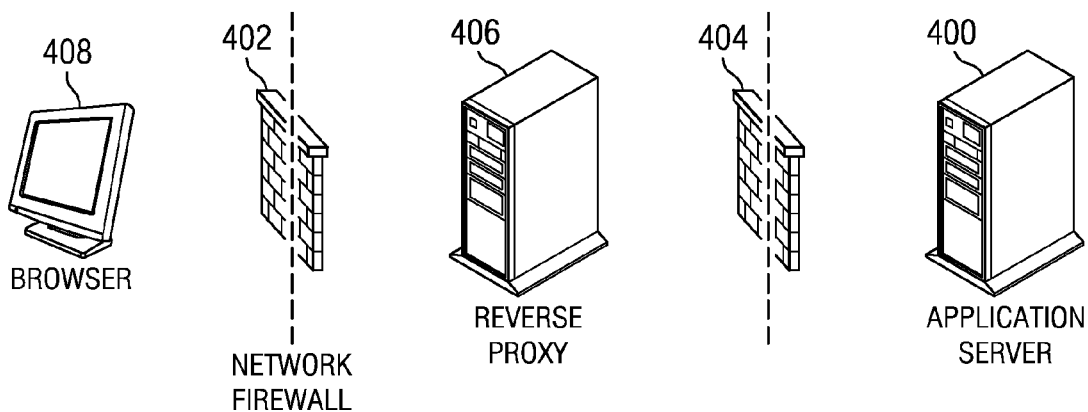
FIG. 4 illustrates a representative Internet application and its various security policy enforcement points.

Preferably, the techniques described herein are integrated with one or more (and preferably all) security policy enforcement points for an application. By way of background, FIG. 4 illustrates a representative Internet-accessible application and its various security policy enforcement points. In this example, the application (or application suite) executes on application server 400. Access to the application is through multiple network components including firewalls 402 and 404, proxy 406, web servers (not shown), and the like. A web browser 408 is used to access the application. Typically, each component enforces its own set of security policies and is unaware of the content in which a particular access is required. Due to this reason, it often occurs that security policies for different components become inconsistent with each other. The techniques of the present invention ameliorate this situation.

Figure 5:
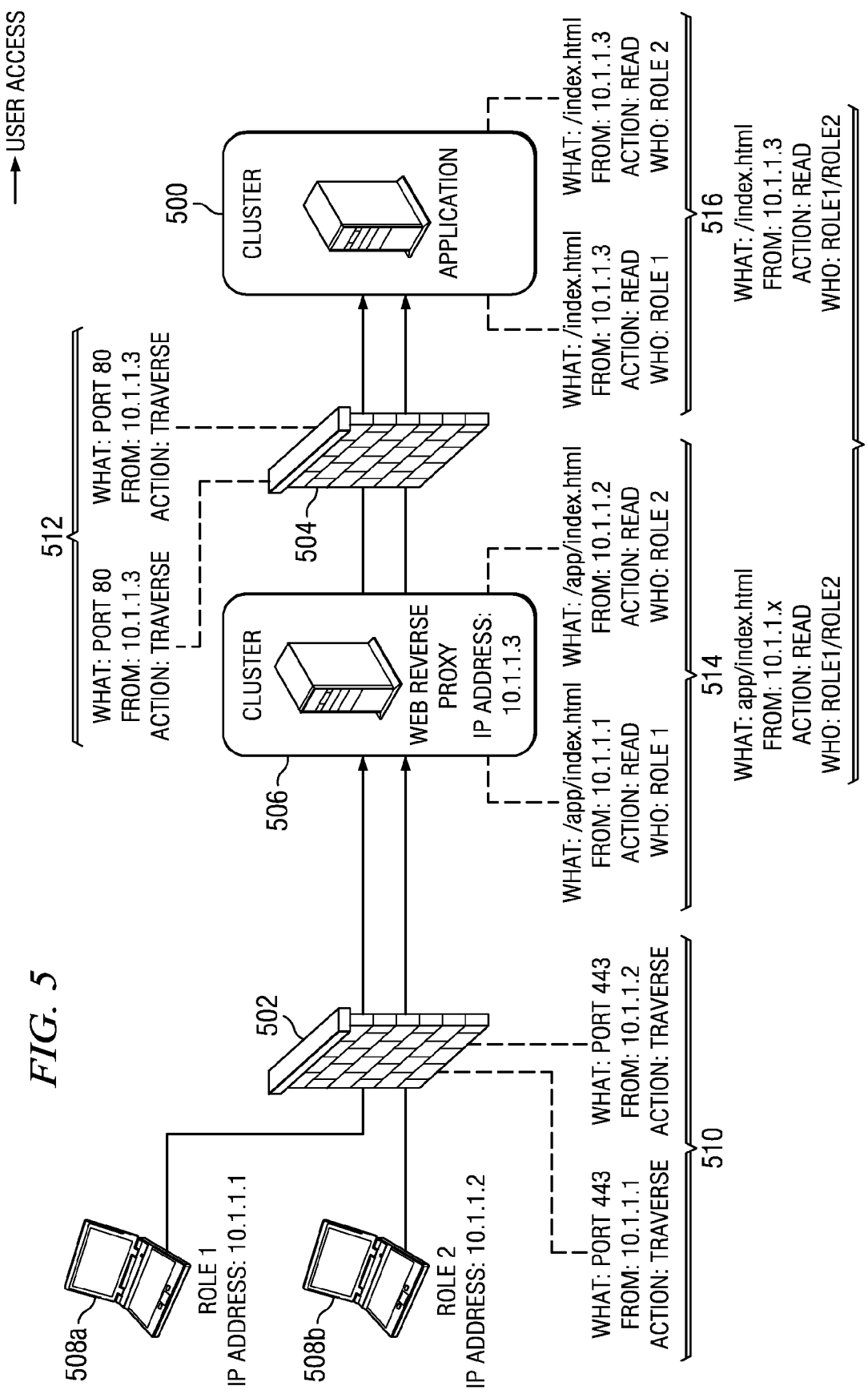
FIG. 5 illustrates how the Internet application of FIG. 4 is exercised by a business security analyst through the role playing technique described herein.

FIG. 5 illustrates how the described technique may be used to design an appropriate security policy for the Internet-accessible application of FIG. 4. In this example, the BSA selects two security roles, role 1 and role 2, and each role is associated with a browser instance 508 at a given IP address. Thus, browser instance 508a (corresponding to role 1) is associated with IP address 10.1.1.1 and browser instance 508b (corresponding to role 2) is associated with IP address 10.1.1.2. The application under test 500 provides a web page (/index.html) that can be read be either role. The network access components include network firewall 502, which includes a port 443 (as is conventional) that can be traversed, as well as an http-based firewall 504, which include a port 80 (as is conventional) that can be traversed. Read access to the application is via a web reverse proxy 506 located at IP address 10.1.1.3.

In operation, the BSA selects a first security role (such as role 1) and accesses one or more (or preferably all) functions of the application required for the role. The application (or, more generally, the security framework) writes the details of the functions accessed in the access logs (not shown), such details typically including URL, access time, and the like. The BSA then selects a second security role (such as role 2) and repeats the process. As described above, the access analyzer reads the access logs and optimizes the access patterns. In particular, and with reference to FIG. 5, the access analyzer creates an Access Control List 510 associated with the network firewall 502 such that IP addresses 10.1.1.1 and 10.1.1.2 can traverse port 443 on this firewall irrespective of role, as role context is not relevant for this TCP operating layer. Likewise, the access analyzer creates an Access Control List 512 associated with internal firewall 504 such that IP address 10.1.1.3 (of the proxy 506) can traverse port 80 on this firewall irrespective of role, as role context is not relevant for TCP as noted above. As a result of the role play accesses, the access analyzer also determines (as evidenced by proxy policy component 514) that the reverse proxy 506 component can provide read access to "/app/index.html" from any IP address 10.1.1.x provided the access is initiated from a user in role 1 or role 2. Likewise, the access analyzer determines (as evidenced by application policy component 516) that the application can provide read access to "/index.html" from just IP address 10.1.1.3 (the proxy) and then only if the request originates from a user in role 1 or role 2. The Access Control Lists 510 and 512 and policies 514 and 516 are then deployed at the policy enforcement points to complete the automated design and deployment process.

While the example in FIG. 5 shows the BSA performing two (2) distinct roles against multiple access components, this is not a limitation or requirement. The technique of role playing and then automatically creating and deploying a policy may be implemented against just a single role and/or with just a single application component. Of course, as additional roles and access components are tested, the policy generated becomes more robust.

The inventive technique is not limited to network access policy management. As noted above, the invention allows a security administrator to configure attributes of the particular application context that can be used to group similar transactions. This enables the policy to be generated at the application layer. For example, assume the Internet application (such as shown above in FIG. 4) is an Internet banking application; the following attribute sets can then be used to group similar transactions: (i) transfer amount, transfer destination, and transfer date (in which case transfers of some amount, to some account and executed on the same day are considered similar); (ii) transfer destination and transfer date (in which case transfers to the same account and executed on the same day are considered similar regardless of the amount); (iii) transfer destination (in which case transfers to the same account are considered similar regardless of the amount or the transfer date). In this example, the access analyzer consolidates the transactions defined as similar into a generic access pattern that preferably comprises the example attributes defined above. The policy generator then translates this access pattern into a policy, as has been described.

Thus, in a typical implementation there is an application (or application suite) that has been developed and for which there is now a need to overlay a security policy definition. Using the above-described technique, the application is deployed in a pre-production environment, and a given user role plays against that application (typically by performing one or more operations as a particular user in a particular group). As the BSA or other operator role plays, the application (or the framework) writes access logs, which are then analyzed and consolidated into a set of commands that drive a policy generator. The policy generator creates an optimized security policy that it then deploys to one or more enforcement points. In this manner, the framework enables automated configuration and deployment of one or more security policies.

In general, the framework enables a user (e.g., an administrator or analyst) to simulate role-specific transactions and then have the framework automatically generate a security policy based on those simulated transactions. Thus, the invention allows the user to express policies in terms that are more business- (as opposed to technology-) oriented. In operation, the user (e.g., the business analyst) role preferably plays at least one specific role (i.e., he or she executes various use cases as they may have been defined in a requirements phase), the system collects access data, and then it uses that data to drive the creation of the security policy or policies.

The disclosed subject matter provides significant advantages. It greatly simplifies policy management by removing the complexity involving with security policy authoring and design. As a result, an IT system can be secured with less time and less potential for errors. The method and system eliminates the need to understand technology-specific policy configuration. The approach tackles the access control problem from a business enablement point of view rather than a policy management point of view. It allows the security administrator to focus on fulfilling a business requirement rather than configuring technology-specific security policies. This aspect of the solution greatly simplifies the process of securing the IT system and makes understanding the security implementation more efficient. By using the above-described techniques, the most complex part of a security management implementation, namely, the policy design, is now automated so that any human error factors are greatly reduced. By using the described invention, more concise policy definitions are also achieved because policy definition occurs for only a well-known set of functions. In addition, by taking advantage of the techniques herein, a security administrator need no longer be an expert in security technologies and products. This reduces the cost involved with education and training. Indeed, using the present invention, even a business analyst can play the role of a security administrator, because the above-described techniques can be implemented with a basic understanding of which IT functions are required for a given role.

Utilizing the inventive technique (e.g. at all enforcement points) ensures that each access component (of a set of access components that are used to access a given application or application suite) only defines policies that are relevant to a specific business security requirement. It also allows a consistent set of policies to be created and applied at every part of the IT system. Using the policy preview feature described above, the security administrator or other user can also review the overarching set of policies generated for a given security role and be confident that all parts of the IT system satisfy the business security requirement.

Although an example of a web application policy definition process has been described above, this is not a limitation. Other examples of access can easily be accommodated by following the same process above, albeit with different instrumented enforcement points. An example may be securing network access to servers through UNIX®/Linux terminal sessions (UNIX is a registered trademark of the Open Group in the United States and other countries).

The functionality described above may be implemented within or as an adjunct to any existing or later-developed security policy management approach. The disclosed technique is not limited to any particular type of application, or any particular type of access or security manager. Also, the term "security framework" should be broadly construed to refer to any existing or later-developed techniques, functions, systems, devices, processes, programs, utilities or the like that are implemented. Moreover, the above-described techniques are not limited to "security" policy design, configuration and deployment. Indeed, the role play and automated policy generation and deployment techniques can be used for other policy management, including, without limitation, privacy policy, and the like.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the role-play interface, access analyzer and policy generator components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a security framework that provides automated security policy definition. The security framework may be extended to include a mechanism for deploying the generated policies.

The security framework may be implemented as an adjunct or extension to an existing access manager or policy management solution.

In an alternative embodiment, the set of role-specific transactions performed by the BSA during the policy generation process may be performed programmatically.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries° technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Having described our invention, what we now claim is as follows.

What is claimed is:

1. A machine-implemented method of policy creation, comprising:
    recording access data as a set of simulated role-specific transactions are performed against an application, the set of simulated role-specific transactions representing activities of a simulated individual belonging to a group that shares a role; and
    based on the simulated role-specific transactions and the recorded access data, using a policy generator executing in a hardware element to automatically generate a policy.

2. The method as described in claim 1 wherein the policy is a security policy.

3. The method as described in claim 1 further including deploying the security policy to one or more policy enforcement points associated with the application.

4. The method as described in claim 3 further including editing the security policy prior to the deploying step.

5. The method as described in claim 1 wherein the simulated role-specific transactions are selected as a function of the role.

6. The method as described in claim 1 further including consolidating two or more transactions of the set of simulated role-specific transactions into a single policy definition based on the recorded access data.

7. The method as described in claim 6 wherein the policy generator generates the policy by processing access patterns as represented by the recorded access data.

8. The method as described in claim 1 wherein the application is an application suite.

9. The method as described in claim 1 wherein the application is an Internet-accessible application.

10. Apparatus, comprising:
   a processor;
   computer memory holding computer instructions for automating security policy definition by a method comprising:
      recording access data as a set of simulated role-specific transactions are performed against an application, the set of simulated role-specific transactions representing activities of a simulated individual belonging to a group that shares a role; and
      based on the simulated role-specific transactions and the recorded access data, automatically generating a policy.

11. The apparatus as described in claim 10 wherein the method further includes deploying the policy to one or more enforcement points associated with the application.

12. The apparatus as described in claim 10 wherein the method further includes consolidating two or more transactions of the set of simulated role-specific transactions into a single policy definition based on the recorded access data.

13. The apparatus as described in claim 12 wherein the policy is generated by processing access patterns as represented by the recorded access data.

14. A computer program product for use in a data processing system comprising a non-transitory computer-readable medium holding instructions that when executed by a processor automate policy definition by the following method:
   recording access data as a set of simulated role-specific transactions are performed against an application, the set of simulated role-specific transactions representing activities of a simulated individual belonging to a group that shares a role; and
   based on the simulated role-specific transactions and the recorded access data, automatically generating a policy.

15. The computer program product as described in claim 14 wherein the method further includes deploying the policy to one or more enforcement points associated with the application.

16. The computer program product as described in claim 14 wherein the method further includes consolidating two or more transactions of the set of simulated role-specific transactions into a single policy definition based on the recorded access data.

17. The computer program product as described in claim 14 wherein the policy is generated by processing access patterns as represented by the recorded access data.

18. A machine-implemented method for designing and deploying security policies, comprising:
   recording access data as a set of role-based transactions are carried out against at least first and second access enforcement points of an application, the set of simulated role-specific transactions representing activities of a simulated individual belonging to a group that shares a role;
   based on the simulated role-specific transactions and the recorded access data, automatically generating a policy;
   automatically deploying the policy to the first and second access enforcement points using a policy manager executing in a hardware element.

19. The method as described in claim 18 wherein each of the first and second access enforcement points is associated with an access component.

20. The method as described in claim 19 wherein the access component associated with the first access enforcement point has a set of security requirements that differs from a set of security requirements of the access component associated with the second access enforcement point.

21. The method as described in claim 18 wherein the application is an Internet-accessible application.

* * * * *